United States Patent [19]
Bradshaw et al.

[11] Patent Number: 5,584,962
[45] Date of Patent: *Dec. 17, 1996

[54] LAMINATING AND ADHESIVE TRANSFER APPARATUS

[76] Inventors: Franklin C. Bradshaw, 8621 E. Cheryl Dr., Scottsdale, Ariz. 85258; Thomas L. Soderman, 14539 Old Guslander Trail, Marine on St. Crois, Minn. 55047

[ * ] Notice: The term of this patent shall not extend beyond the expiration date of Pat. No. 5,580,417.

[21] Appl. No.: 247,003

[22] Filed: May 20, 1994

[51] Int. Cl.⁶ ............................................. B32B 31/04
[52] U.S. Cl. .................... 156/495; 156/522; 156/555; 100/176; 242/156; 242/419.9
[58] Field of Search ........................ 156/522, 555, 156/583.1, 229, 494, 495, 510; 492/47, 60; 100/155 R, 176; 425/363; 242/156, 419.8, 419.9

[56] References Cited

U.S. PATENT DOCUMENTS

| | | | |
|---|---|---|---|
| 2,647,299 | 8/1953 | Thomas | 492/47 X |
| 3,309,983 | 3/1967 | Dresser | 156/555 X |
| 3,737,359 | 6/1973 | Levitan | 156/522 |
| 3,901,758 | 8/1975 | Humphries | 156/499 |
| 4,151,900 | 5/1979 | Kirwan | 188/174 |
| 4,387,000 | 6/1983 | Tancredi | 156/555 X |
| 4,619,728 | 10/1986 | Brink | 156/555 |

*Primary Examiner*—James Sells
*Attorney, Agent, or Firm*—Gregory J. Nelson

[57] ABSTRACT

A multi-purpose laminating and adhesive transfer apparatus having a frame supporting rotatably engaging nip rollers. The frame and has upper and lower feed rolls which may be a laminate, film or paper, or an adhesively coated film or a film having an affinity for adhesive. The upper and lower feed rolls containing the webs of laminating or adhesive transfer material have tensioning caps which can be adjusted to provide the proper tensioning to prevent the rollers from overrunning as they rotate. The tensioning caps are pre-set and provided to the user. A cutter blade is positioned at the discharge side of the nip rollers and may be actuated to sever the master at any desired location. The apparatus may be operated to apply lamination to either top or bottom surfaces of a substrate.

18 Claims, 4 Drawing Sheets

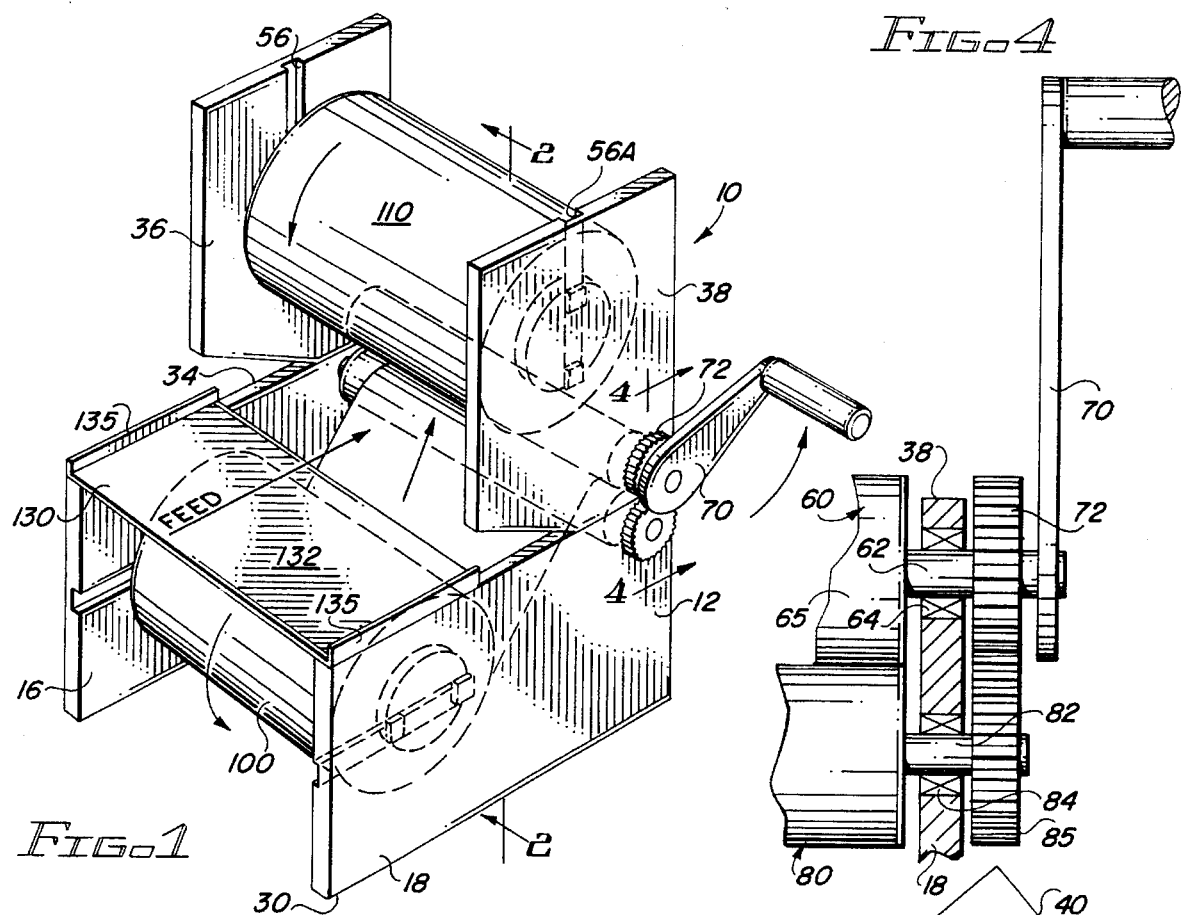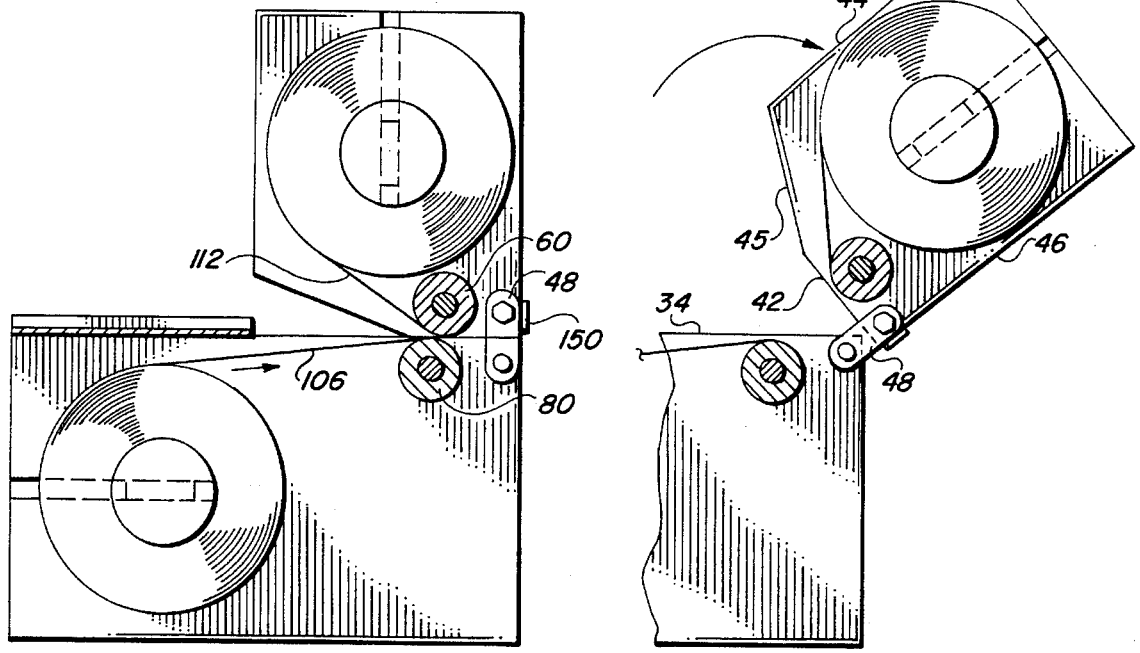

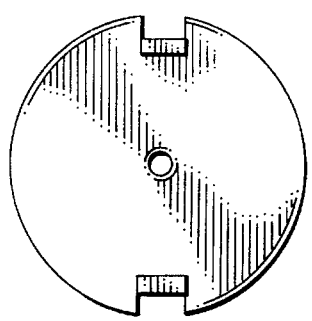
FIG.6
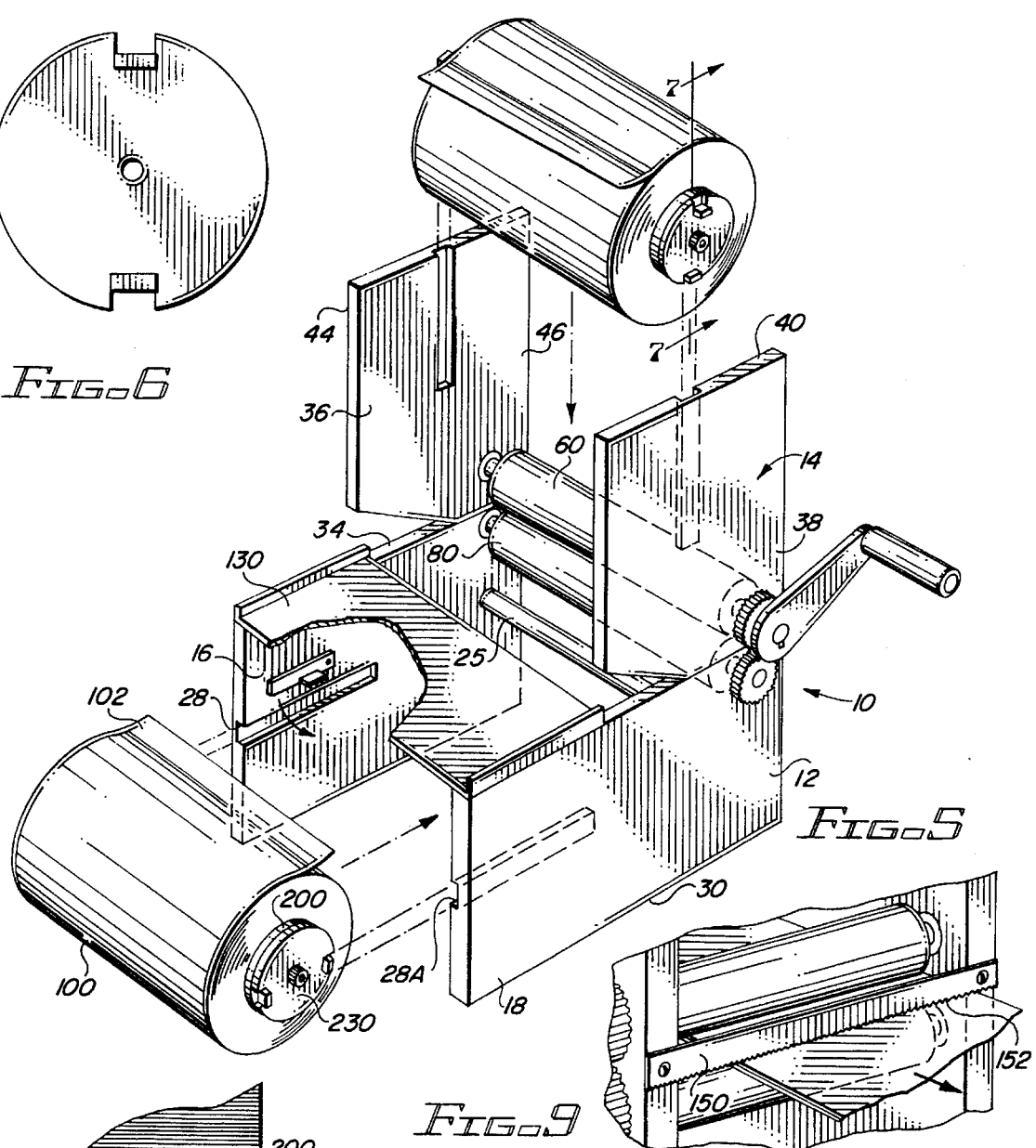
FIG.5
FIG.9
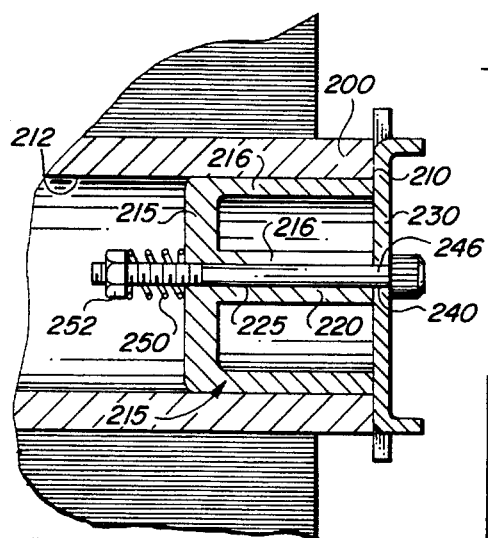
FIG.7
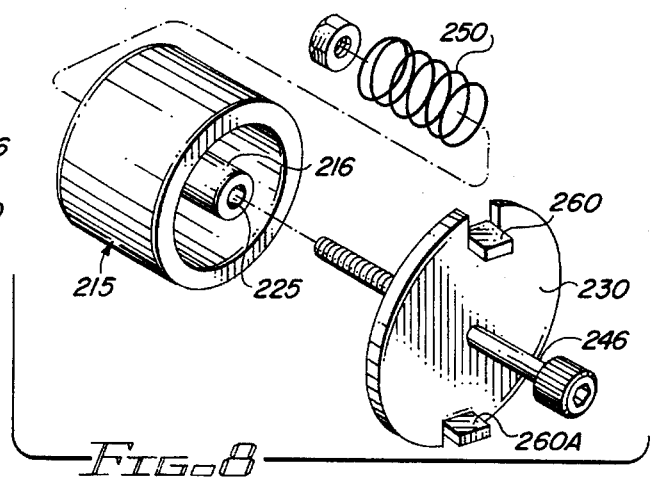
FIG.8

LAMINATING AND ADHESIVE TRANSFER APPARATUS

FIELD OF THE INVENTION

The present invention relates to a device which will laminate objects and which also will transfer adhesive to a substrate for purposes such as labeling.

BACKGROUND OF THE INVENTION

It is common practice to protect documents and other items by encasing them in clear plastic coverings. Various products, generally known as protectors are available for this purpose. Another common way of protecting documents is to laminate them. Lamination involves sealing the document or item between oppositely applied transparent films.

Another operation which is commonly applied to documents and papers is that of adhesive transfer. Adhesive transfer is practiced when it is desired, for example, to make labels or stickers. One manner of producing such stickers and labels is to print the stickers or labels on blanks provided for this purpose. The blanks generally have an adhesive backing and are secured to a liner from which they are peeled at the time of use. This manner of making labels or stickers is expensive and further is limiting in that the printed :material must be adapted to the physical size or confines of a label or sticker which is generally small in size.

Based on the foregoing, there exists a need for a multi-purpose machine which can both serve to apply laminates to documents and papers and which will also serve the purpose of adhesive transfer to materials of various sizes. For example, the apparatus of the present invention can apply clear plastic laminates to master substrates of various sizes and similarly can transfer adhesive to master substrates of various sizes and not limited by length. The adhesive transfer can be applied to either surface of the master as desired.

SUMMARY OF THE INVENTION

Briefly, in accordance with the present invention, a multi-purpose laminating and adhesive transfer device is provided which has a frame member with mounting means for receiving a first roll material such as a laminate or roll of film coated with releasable adhesive. A first nip roller extends transversely across the base. An upper frame member is pivotally secured to the base. The upper frame member has means for mounting or securing a roll of material such as a laminating film or a paper or film which has affinity for an adhesive. A second nip roller extends transversely across the upper frame member and, with the upper frame member positioned in the operative position relative to the base, the nip rollers engage or are closely proximate to one another. An actuator which may be powered or may be manual such as a hand crank is provided for driving or rotating at least one of the nip rollers. The upper frame member can be pivoted to an open position to facilitate loading of rolls of material in the base and upper frame member and to facilitate their insertion between the nip rollers. In an alternate embodiment, one of the nip rollers is mounted on a gibb plate so the rollers may be "opened".

The upper and lower rollers containing the webs of laminating or adhesive transfer material have tensioning caps which can be adjusted to prevent the rollers from overrunning as they pay-out material. The tensioning caps may be pre-set by the material supplier or may be adjusted at the time of use.

A feed tray is mountable either to the base or the upper frame member for feeding the master to be processed. By way of example, the lower feed roll can be a flexible film with an adhesive and the upper feed roll a supply of film with has an affinity for adhesive. A pre-printed master such as a master consisting of labels repetitively printed on a sheet can be fed via the feed tray to the interface between the nip rollers. Adhesive will be transferred from the bottom web to the labels with excess adhesive being picked up by the top web. The labels are now provided with an adhesive and may be severed at a cutting edge provided at the rear of the device.

Accordingly, it is a primary and broad object of the present invention to provide a simple and efficient laminating and/or adhesive transfer device.

BRIEF DESCRIPTION OF THE DRAWINGS

The above and other objects, advantages and features of the present invention will be more fully understood from the following description, claims and drawings in which:

FIG. 1 is a perspective view of the transfer device of the present invention shown in an operative position;

FIG. 2 is a sectional view of the transfer device of the present invention shown in an operative position taken along line 2—2 of FIG. 1;

FIG. 3 is a partial side view showing the device in an open or loading position;

FIG. 4 is a view taken along lines 4—4 of FIG. 1 with the feed rolls removed;

FIG. 5 is an exploded perspective view of the device;

FIG. 6 is an end view of a feed roller;

FIG. 7 is a sectional view taken along line 7—7 of FIG. 5;

FIG. 8 is an exploded view showing the tensioning cap positioned at the end of a feed roll;

FIG. 9 is a partial rear perspective view showing the cut-off blade;

Figure 10:
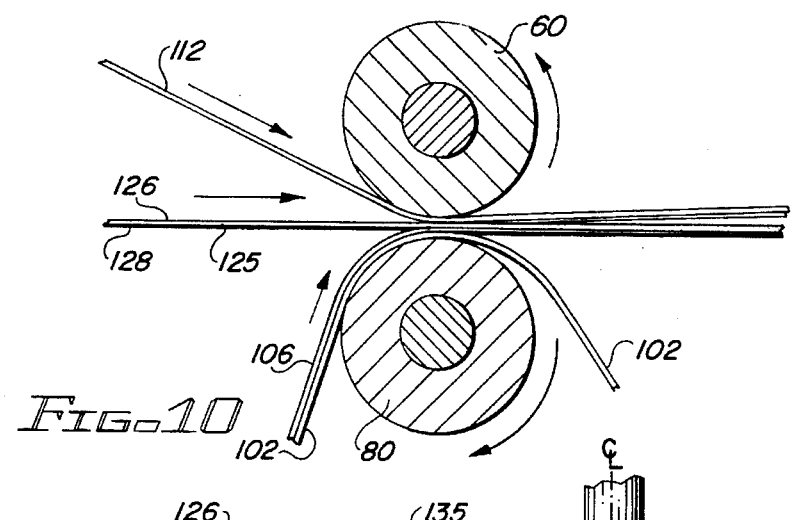
FIG. 10 is a view showing a master fed between the nip rollers.
Figure 11:
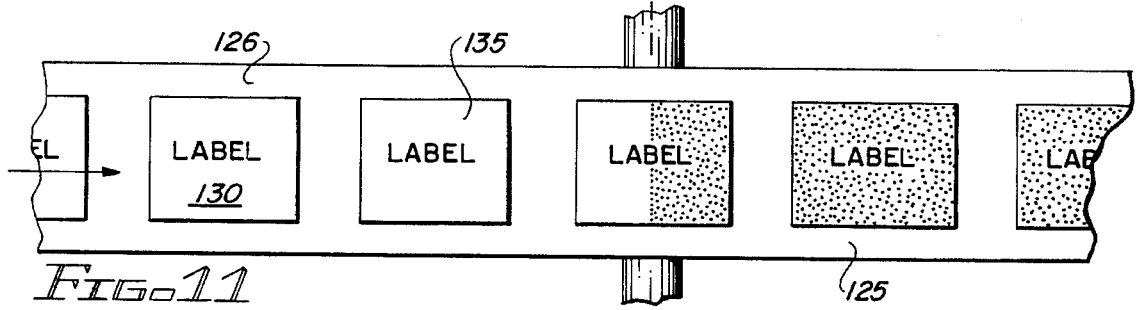
FIG. 11 is a plan view of the feed master showing adhesive applied.
Figure 12:
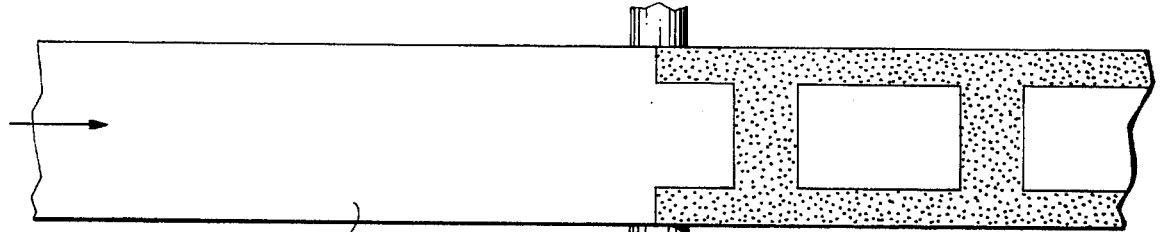
FIG. 12 is a plan view of the upper feed web showing pick up of excess adhesive thereon.
Figure 13:
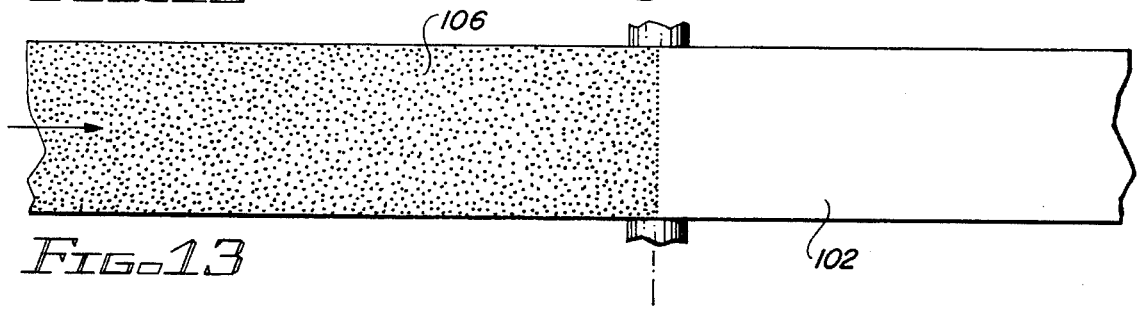
FIG. 13 shows the removal of adhesive from the lower web.

Turning now to the drawings, particularly FIGS. 1 to 5, the apparatus of the present invention is generally designated by the numeral 10 which includes a lower frame member or base 12 and an upper frame member 14. The lower frame member consists of spaced-apart side plates 16 and 18 secured in spaced-apart relationship by transversely extending spacer rod 25. The inner faces of the side plates are provided with horizontally extending grooves 28 and 28A which provide mounting means to accommodate the insertion of feed rolls as will be explained hereafter. The side plates are shown as rectangular having a bottom edge 30 which serves as a supporting surface or stand for the apparatus and a horizontal top edge 34.

The upper frame member 14 includes a pair of spaced-apart side plates 36 and 38. The side plates 36, 38 are shown as each having top and bottom edges 40 and 42 and front and rear edges 44, 46, respectively. An angular surface 45 extends between the bottom edge and the front edge to facilitate access to the nip rollers for loading and unloading.

Plates 36, 38 are pivotally mounted to lower plates 16 and 18 by means of pivot link 48. In the normal operative position, the bottom edge 42 of the upper side plates rests on the upper horizontal surface 34 of the lower side plates. In the open position, as shown in FIG. 3, the upper frame member is rearwardly tilted about pivot 48 to a position in which the rear surface of the lower end plates engage the lower edge of the upper frame member to provide access for loading and unloading.

Feed material is secured in the upper frame member by inserting a feed roll into slots 56 and 56A extending vertically in the inner surface of the opposite plates.

An upper nip roller 60 extends transversely between the side plates of the upper frame member positioned adjacent the lower edge 42 of the plates. The upper nip roller includes an axial shaft 62 which is rotatable in a suitable bearings or bushings 64. A stop nut or cap, not shown, is provided at the left end of the shaft, as viewed in FIG. 1.

The shaft is covered by a cylindrical roller member 65 of resilient material such as rubber. The shaft 62 projects exteriorly of the side plate 38 and is shown carrying a hand crank 70 for manually rotating the roller and shaft. Alternatively, the rollers may be powered by an electrical driven motor. A pinion gear 72 is secured to the shaft 62 adjacent the exterior surface of side plate 38, as best seen in FIG. 4.

A second nip roller 80 extends transversely between the lower side plates positioned parallel to the upper nip roller. The lower nip roller may be vertically aligned with the upper nip roller but preferably is forwardly displaced a small distance ahead of the upper nip roller as for example ¼" as seen in FIG. 2. The lower nip roller has a shaft 82 which is rotatable in bearings or journals 84 in the side plates 16 and 18. A pinion gear 85 is carried on the extension of shaft 82 at side plate 18. When the upper frame is in its operative position, gear 85 will engage the upper pinion gear 72 so that actuation of the upper nip roller shaft by crank 70 or by other power means will impart rotation to both nip rollers.

As mentioned above, the device may be used as a laminator or as an adhesive transfer device. In the case of use as an adhesive transfer device, a lower feed roll 100 carrying a transferrable adhesive is secured in the lower frame member. Referring to FIGS. 10 to 13, the feed roll includes a web 102 of flexible carrier material having release characteristics on the lower surface and an adhesive coating 106 on the other surface. With the roll in position, the end of the web 102 is extended over the lower roller 80 as shown in FIGS. 2 and 10. An upper feed roll 110 is positioned in engagement with the slots 56 and 56A in the interior surface of the upper side plates. The upper feed roll, in the case of adhesive transfer, will consist of a web 112 of material such as inexpensive paper or film having an affinity for adhesive. The end of the web 112 is extended between the nip rollers with the end of the web adhesively secured to the web of the master 125 in the lower roll.

The upper frame member is then rotated to a closed position bringing the nip rollers 60 and 80 into engagement or close proximity with the webs 102, 112 and master 125 compressed therebetween.

A feed tray 130 which consists of a planar feeding surface 132 and opposite extending flanges 135, 135A is suspended from the sides of the lower frame member. This is accomplished by engaging flanges 135 and 135A with the respective upper edges of the side plates.

Referring to FIG. 9, cutter bar 150 is shown which extends transversely between the lower side plates rearwardly of the nip rollers. The cutter bar 150 has a sharpened edge 152 which allows the operator to easily manually sever a master at any location as it is being processed when it emerges rearwardly from between the nip rollers.

Referring to FIGS. 10–13, the master, which is designated by the numeral 125, consists of a continuous sheet of material having an upper surface 126 and a lower surface 128. The upper surface 126 is imprinted with indicia 131 forming a repetitive pattern of labels which have been pre-printed as desired, although the master can be any pre-printed documents or series of documents. The master is aligned on the feed tray with the free edge of the master positioned on the exposed adhesive surface 106 of the lower feed stock. The slight forward protrusion of the lower nip roller facilitates securing the master to this location.

The operator then actuates the machine by operating the crank which will rotate the upper nip roller 60 and by means of the inter-engaging pinion gears, cause rotation of the lower nip roller 80. This rotation will advance the upper web 112, lower web 106 and the master 125. As the master proceeds between the nip rollers, the exposed adhesive 106 from the lower web will be transferred to the lower surface 128 of the master. The upper web will pick up any excess adhesive not transferred to the master, as for example areas outside the perimeter of the label areas 130. The upper pick-up web should be wider than the adhesive web. The master may then be easily severed into individual labels by transversely severing the master at predetermined locations. The labels are shown as being on a continuous strip which has been pre-printed with the desired indicia 135.

Note that the master can be oriented with either the printing or indicia facing upwardly or downwardly, depending on the user's requirements. For example, if the labels are to be applied to the inside of a window, the master would be in most cases fed into the applicator with the printing downwardly positioned so adhesive would be applied over the printing 130. The apparatus can apply lamination to either the top or bottom surfaces of a substrate or adhesive to the top or bottom surfaces of a substrate or to both. The device can also perform combination operations of applying both a laminate and an adhesive to a substrate.

The characteristics of the lower web are such that the adhesive 106 is a non-aggressive adhesive loosely adhered to the surface of the web. Thus, the lower web serves as a peelable covering which can be stripped away at the time the master is to be used by adhesively applying the master to a surface.

One significant advantage of the device of the present invention is that the upper and lower feed rolls may be provided to the end user pre-wound and properly tensioned so as to not overrun during operation. The proper tensioning of the feed rolls is accomplished by means of a tensioning device as best seen in FIGS. 7 and 8. In FIGS. 7 and 8, one end of the feed roll core 200 is shown about which is wound the roll of web material and which is representative of either roll 100 or 110. The core is a cylinder of cardboard or plastic having an end face 210. Core 200 has an interior 212 which receives end cap 215. The cap may be of molded plastic or other similar material having an interior outer wall 216. A boss 220 is concentrically formed in the cap with respect to the cylindrical wall 216. Boss 220 defines an axial bore 225. The cap 215 is positioned slightly inwardly of the end 210 of the core and may be adhesively secured in place to the interior wall 212 of the roll core.

A circular end plate 230 abuts the end of the core having a diameter slightly greater than the diameter of the core. The end plate has a central aperture 240 which receives the threaded shaft of bolt 246. A spring 250 is interposed between the head of the bolt and the interior face of the cap 215. A nut 252 engages the threaded end of the bolt. The head of the bolt 246 bears against the exposed surface of the end plate and the position of the nut determines the frictional resistance that exists between the interior surface of the end plate 230 and the end face 210 of the core of the roller. This tension is pre-adjusted by the manufacturer to provide the proper roll tension depending upon the type of material, size of the material, thickness of the material and other factors.

Mounting tabs 260 and 260A project outwardly from the end plate and are engageable in the mounting slots provided on the interior surfaces of the upper and lower end plates of the applicator device.

Thus, it will be seen that inserting a supply of feed stock either in the upper or lower frames is easily accomplished. The existing or spent feed rolls are removed by sliding them outwardly to disengage the tabs from the slots. The new roll is inserted by aligning the mounting tabs with the slots and sliding the new feed roll into place.

The feed rolls may be supplied with various types of feed stock webs such as clear laminates, paper for removing excess adhesive or rolls of material having a loose adhesive coating and a release coating on the opposite surface.

Figure 14:
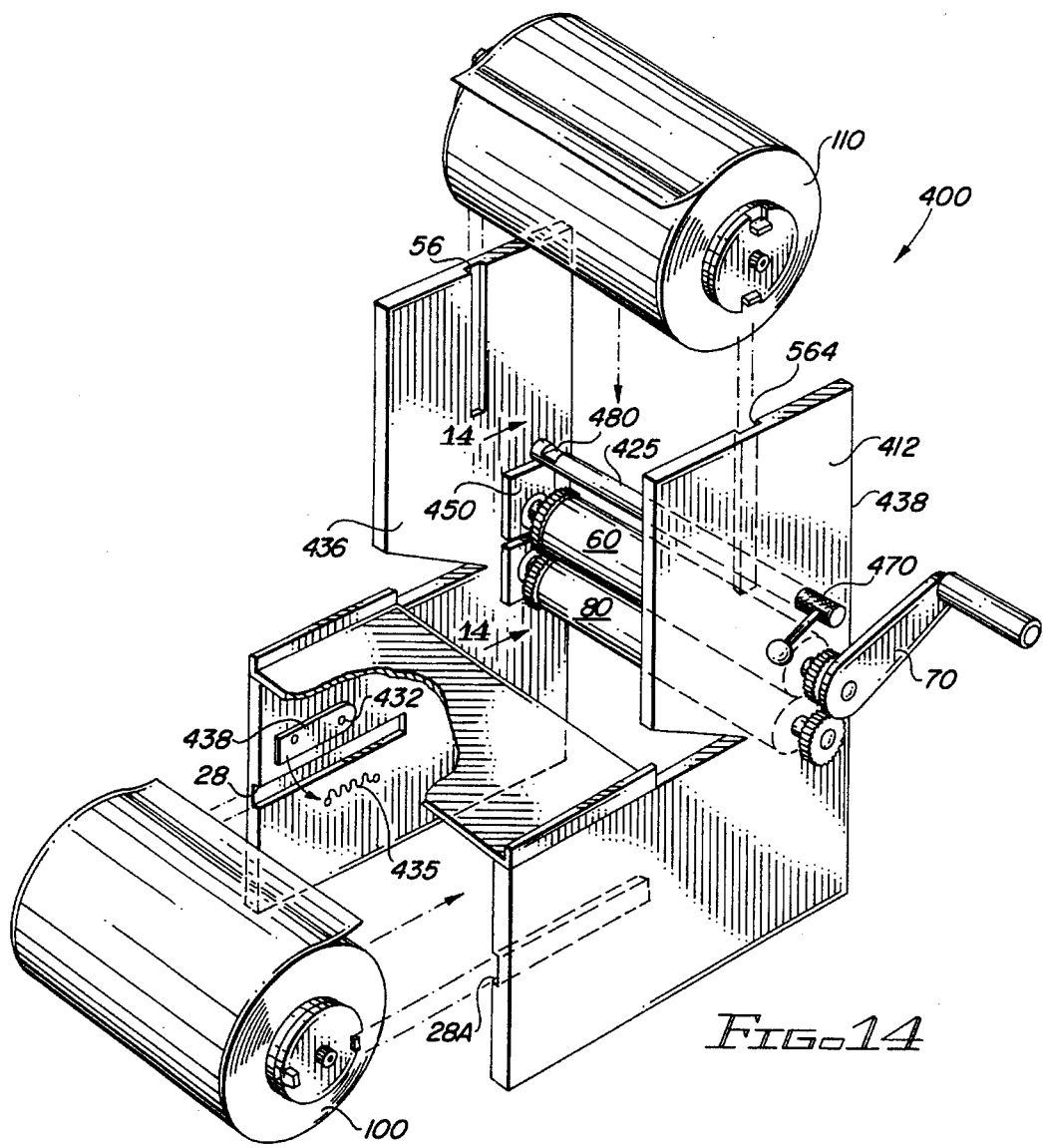
FIG. 14 is a perspective view of an alternate embodiment of the invention.
Figure 15:
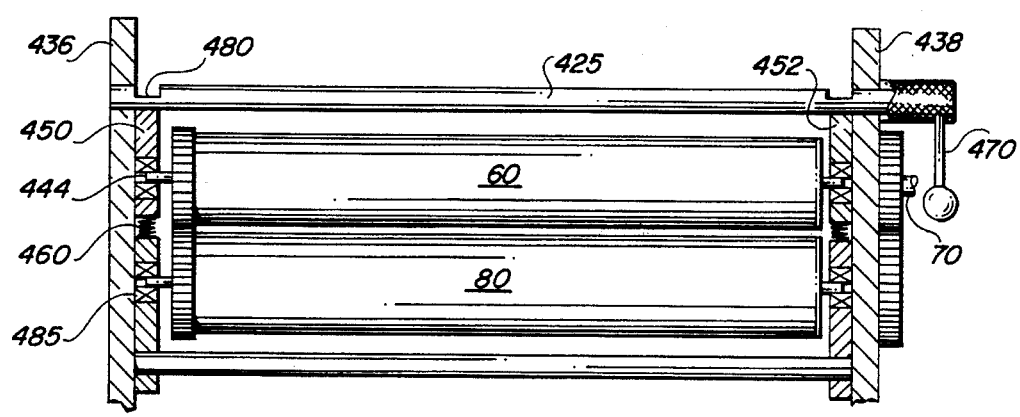
FIG. 15 is a sectional view taken along line 15—15 of FIG. 14.

FIGS. 14 and 15 show an alternate embodiment of the apparatus of the present invention which is generally designated by the numeral 400. Elements which are the same or similar to elements described with respect to the preceding figures are identified by the same numerals. The apparatus of FIGS. 14 and 15 has a frame consisting of opposite side walls 436 and 438. The side walls are again provided with vertically extending grooves 56, 56A and horizontally extending grooves 28, 28A which accommodate the insertion of feed rolls 110 and 100, respectively. In this embodiment, the side walls of the frame are fixed and separation of nip rollers 60 and 80 is accomplished by means of a gibb plate arrangement as will be explained hereafter.

Since mounting slots 56, 56A are vertically disposed, the weight of the roller 110 will maintain the feed roll in the proper position. Preferably the feed rollers 100 and 110 are positioned as close to the nip rollers as possible to maintain accurate feeding and to minimize misalignment. It may be desirable to provide positive biasing means to urge feed roll 100 rightwardly as shown in FIG. 14. To this end, a link 430 is pivotally secured at pivot point 432 to the interior of the side wall 436. A similar link may be disposed on the interior side wall 438. A spring 435 is disposed below the slot 28. When the roll 100 is inserted, link 432 may be rotated downwardly as indicated by the arrow and engaged with spring 435 to apply a biasing force to the feed roll to maintain it in a secure position.

As indicated above, it is desirable that the nip rollers 60 and 80 be separated to provide access for purposes of loading the apparatus. In the prior embodiment, access was provided by a frame arrangement in which one portion of the frame is pivotal with respect to the other. In the embodiment of FIGS. 14 and 15, the lower nip roller 80 extends between the interior side walls of the side plate and mounted at opposite ends at bearing arrangement 485. The upper nip roller 60 is provided with opposite stub shafts 444 which are received in bearings in opposite gibb plates 450 and 452. Gibb plates 450 and 452 are vertically slidable and are upwardly biased by springs 460. In FIG. 15, the rollers are shown in a closed position in which they are in contact or close engagement. The nip rollers are maintained in position by shaft 425 which is operated by nip engagement lever 470. It will be seen that by rotating lever 470, shaft 425 will be rotated bringing notches or grooves 480 into engagement with the upper end of the gibb plates 450, 452. This will allow the gibb plates and nip roller 60 to move upwardly separating from lower nip roller 80. In the closed position, as shown in FIG. 15, the shaft 425 is rotated into engagement with the gibb plates 450, 452 to force the gibb plates and upper nip roller downwardly into engagement with the lower roller overcoming the bias of the springs 460.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

We claim:

1. An applicator and transfer device comprising:

(a) a frame having opposite sides;

(b) a first nip roller rotatably mounted and extending between said sides of said frame;

(c) a first mounting means for mounting a feed roll to said frame;

(d) second nip roller rotatively mounted and extending between said sides of said frame adjacent said first nip roller;

(e) second mounting means for mounting a feed roll to said frame;

(f) actuating means for imparting rotation to at least one of said nip rollers;

(g) first and second feed rolls of material each having a generally cylindrical core about which feed material is wound and being supported for rotation in said respective first and second mounting means; and (h) pre-tensioning means associated with each of said cores for selectively establishing a predetermined resistance to rotation of the rolls of material to provide the proper application tension for unwinding the feed material wherein said pre-tensioning means includes a tensioning cap affixed to said cores, said caps having an end plate engaging the end of the associated core and said plate with securement means engageable in said mounting means and further including biasing means for applying a predetermined force biasing said end plate into engagement with the end of said roll core.

2. The applicator and transfer device of claim 1 including means for moving said nip rollers from a first position out of engagement into a second position into engagement with one another.

3. The applicator and transfer device of claim 1 wherein said first and second mounting means comprises slot means located in the opposite sides of the said frame.

4. The applicator and transfer device of claim 1 further including feed tray means polished adjacent said nip rollers.

5. The applicator and transfer device of claim 4 further including cut-off means located adjacent the nip rollers opposite the feed tray.

6. The applicator and transfer device of claim 1 wherein the axis of said nip rollers are parallel to one another and wherein the axis of one of said nip rollers is horizontally displaced relative to the other nip roller.

7. The applicator and transfer device of claim 1 further including biasing means for maintaining said feed rolls in their respective mounting means.

8. The applicator and transfer device of claim 2 wherein said means for moving said nip rollers comprises a gibb plate.

9. The applicator and transfer device of claim 1 wherein said rolls are located immediately adjacent the associated nip roller.

10. An applicator and adhesive transfer device comprising:
 (a) an upper frame member having opposite sides and a lower frame member having opposite sides, said upper frame member being pivotally connected to said lower frame member;
 (b) a first nip roller rotatively mounted and extending between the sides of said upper frame member:
 (c) first mounting means associated with the upper frame member;
 (d) a second nip roller rotatively mounted and extending between the sides of said lower frame member;
 (e) second mounting means associated with the said lower frame member;
 (f) first and second rolls of feed material each having a generally cylindrical core about which the feed material is wound and being supported for rotation in said respective first and second mounting means;
 (g) pre-tensioning means integrally associated with each of said cores for selectively establishing a predetermined resistance to rotation of the rolls of feed material to provide the proper application tension for the feed material, said pre-tensioning means including a tensioning cap affixed to said associated core having an end plate engaging the associated core and said plate having with securement means engageable in said mounting means and further including biasing means for applying a predetermined force biasing said end plate into engagement with the associated core; and
 (h) actuating means for imparting rotation to at least one of said nip rollers.

11. The applicator and adhesive transfer device of claim 10 wherein said upper frame member is pivotal between a non-actuated position and an actuated position in which the nip rollers are in engagement.

12. The applicator and adhesive transfer device of claim 11 further including gear means associated with said first and second nip rollers wherein actuation of one nip roller will impart rotation to the other of said nip rollers.

13. The applicator and adhesive transfer device of claim 10 wherein said mounting means comprises slot means in said upper and lower frame members and further including first and second feed rolls each having engagement means engageable in said mounting means.

14. The applicator and adhesive transfer device of claim 13 wherein said engagement means includes pre-tensioning means for controlling the pay-out of feed material from said rolls.

15. The applicator and adhesive transfer device of claim 10 wherein said core has an end plate engaging the opposite ends of said core with projection means engageable in said mounting means and further including means for applying a predetermined force biasing said end plate into engagement with the ends of said roll core.

16. The applicator and adhesive transfer device of claim 10 further including a feed tray generally aligned with the inner face of the nip rollers when said nip rollers are in said second engaged position.

17. The applicator and adhesive transfer device of claim 10 further including cut-off means.

18. The applicator and adhesive transfer device of claim 10 wherein the axis of said second nip roller is horizontally displaced from the axis of said second nip roller.

* * * * *